March 3, 1931.    G. HERRNHEISER    1,794,853
APPARATUS FOR DIRECTING X-RAYS
Filed Dec. 24, 1929
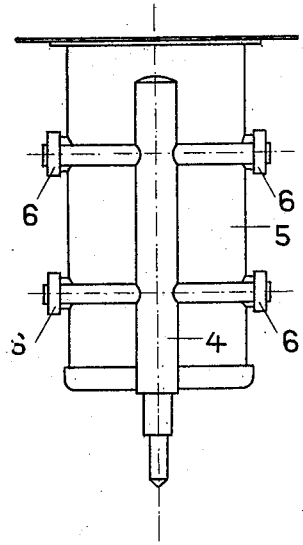
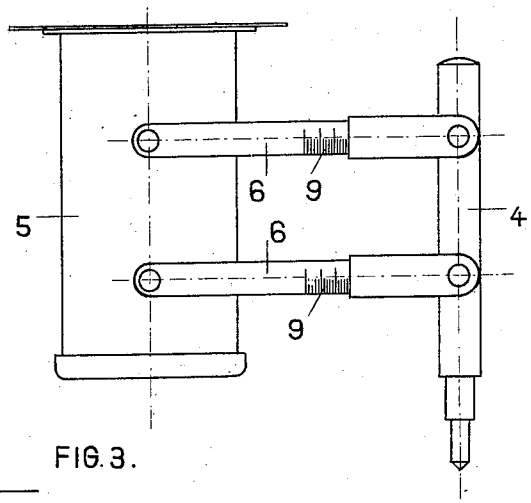
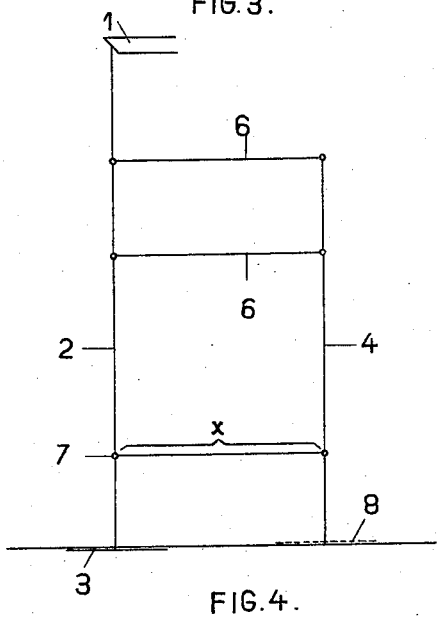
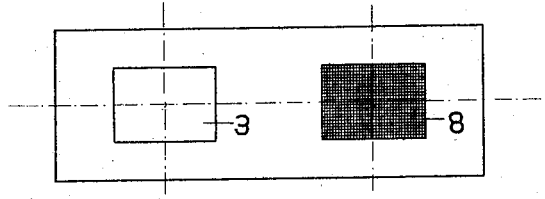
Inventor:
Gustav Herrnheiser
By [signature]
Attorney.

Patented Mar. 3, 1931

1,794,853

UNITED STATES PATENT OFFICE

GUSTAV HERRNHEISER, OF PRAGUE, CZECHOSLOVAKIA

APPARATUS FOR DIRECTING X-RAYS

Application filed December 24, 1929, Serial No. 416,234, and in Czechoslovakia March 21, 1928.

This invention relates to an auxiliary apparatus for adjusting the direction of X-rays, and consists essentially in this, that an auxiliary sight is attached by means of a parallel guiding mechanism to a part of the apparatus which is coaxial with the central ray of the beam. This auxiliary sight is directed towards a point (auxiliary target) at a definite distance from the place to which the rays are directed (target), and the parallel guiding mechanism brought into such a position that now also the central ray of the beam is directed to the target. The apparatus can also be used with advantage to receive obliquely directed rays with certainty, within the boundary of a photographic plate.

In the accompanying drawings a construction of the apparatus is illustrated by way of example.

Figure 1 shows a front elevation.
Figure 2 shows a side elevation.
Figures 3 and 4 are respectively an elevation and a plan view of the apparatus shown in diagrammatic form.

In the example illustrated, the apparatus consists of an auxiliary sight bar 4, which is linked with the tube 5, by a parallelogram link mechanism 6, in such a way that the link axes lie in a plane passing through the axis of the diaphragm tube and therefore through the central ray 2 (Figure 3).

From the diagram in Figure 3 it is clear that by setting the bar 4 at a certain distance $x$ from the target 7, the central ray 2 from the anticathode 1 of the tube, must also fall on this point 7, if the arms 6 of the parallelogram link mechanism are placed parallel to the direction of $x$, and are equal in length to this distance.

In order to be able to use the auxiliary apparatus advantageously in X-ray photography, beside the plate 3, there is placed a grating 8 of the same size as the plate, on which grating the auxiliary sighting bar 4 shows the position of the ray falling on the photographic plate (see Figures 3 and 4).

The length of the parallelogram link mechanism 6 is preferably adjustable as shown at 9 in Figure 1.

What I claim is:
1. Auxiliary apparatus for correctly directing X-rays, having a member, coaxial with the central ray of a beam adapted to be projected therethrough, an auxiliary sight, a linking mechanism linking the auxiliary sight to the said member, the link axes of the said linking mechanism lying in a plane passing through the central ray, whereby, by adjusting the auxiliary sight on an auxiliary target lying at a given distance in a given direction from a main target, by displacing the auxiliary sight in the said direction, over the said distance, the central ray is directed to the main target.

2. An apparatus as claimed in claim 1, in which the linking mechanism consists of a parallelogram link mechanism.

3. For the purpose of X-ray photography, an auxiliary apparatus as claimed in claim 1, in combination with a photographic plate and a grating of the same size as the photographic plate, in order to indicate by means of the auxiliary sight the point of incidence of the central ray on the photographic plate.

4. An apparatus as claimed in claim 1, in which the said member consists of a tube.

In testimony whereof I affix my signature.
GUSTAV HERRNHEISER.